US012027826B2

(12) United States Patent
Ma

(10) Patent No.: US 12,027,826 B2
(45) Date of Patent: Jul. 2, 2024

(54) SPARK PLUG

(71) Applicant: Federal-Mogul Ignition LLC, Southfield, MI (US)

(72) Inventor: Shuwei Ma, Ann Arbor, MI (US)

(73) Assignee: FEDERAL-MOGUL IGNITION LLC, Southfield, MI (US)

( * ) Notice: Subject to any disclaimer, the term of this patent is extended or adjusted under 35 U.S.C. 154(b) by 0 days.

(21) Appl. No.: 17/972,519

(22) Filed: Oct. 24, 2022

(65) Prior Publication Data

US 2024/0136804 A1 Apr. 25, 2024

(51) Int. Cl.
*H01T 13/20* (2006.01)
*H01T 13/06* (2006.01)

(52) U.S. Cl.
CPC ............. *H01T 13/20* (2013.01); *H01T 13/06* (2013.01)

(58) Field of Classification Search
CPC ................................ H01T 13/20; H01T 13/06
See application file for complete search history.

(56) References Cited

U.S. PATENT DOCUMENTS 5,990,602 A 11/1999 Katoh et al.
6,885,135 B2 4/2005 Kanao et al.
7,449,823 B2 11/2008 Menken et al.
7,808,165 B2 10/2010 Kowalski
7,948,159 B2 5/2011 Lykowski
8,337,269 B2 12/2012 Boehler et al.
8,350,454 B2 1/2013 Passman et al.
2006/0082276 A1 4/2006 Havard et al.
2007/0130924 A1 6/2007 Seo
2011/0285270 A1* 11/2011 Tanaka .................... H01T 13/39 313/141
2013/0069516 A1* 3/2013 Sumoyama ............. H01T 13/39 313/141
2014/0111078 A1* 4/2014 Kowalski ................ H01T 13/20 313/141
2014/0265815 A1* 9/2014 Quitmeyer .............. H01T 21/02 445/7
2015/0236482 A1* 8/2015 Kowalski ................ H01T 21/02 313/142
2017/0222406 A1 8/2017 Coupland et al.
(Continued)

FOREIGN PATENT DOCUMENTS

DE 102006009790 A1 * 9/2007 ............. H01T 13/20
DE 202015101894 U1 5/2015
EP 2012397 A2 1/2009
(Continued)

*Primary Examiner* — Zheng Song
*Assistant Examiner* — Glenn D Zimmerman
(74) *Attorney, Agent, or Firm* — REISING ETHINGTON P.C.

(57) ABSTRACT

A spark plug having a firing pad with minimal silicon diffusion and limited silicon oxidation at grain boundaries that can cause undesirable vertical cracking. In one embodiment, the firing pad has a multilayer structure having a base layer and a firing layer, wherein the base layer is a non-precious metal based material having silicon, and wherein the firing layer is a precious metal based material having yttrium in an amount of 0.1 to 0.5 wt %, inclusive. After at least 190 hours of isothermal treatment of at least 1000° C., an extent of vertical cracking from the sparking surface does not exceed 50% of a thickness of the firing pad or the firing layer.

20 Claims, 5 Drawing Sheets

(56) References Cited

U.S. PATENT DOCUMENTS

| | | | | |
|---|---|---|---|---|
| 2022/0149598 | A1 * | 5/2022 | Trebbels | H01T 13/32 |
| 2022/0166196 | A1 * | 5/2022 | Sekizawa | H01T 13/20 |

FOREIGN PATENT DOCUMENTS

| | | | | | |
|---|---|---|---|---|---|
| EP | 2578835 | A1 | | 4/2013 | |
| JP | 3135224 | B2 | | 2/2001 | |
| JP | 2002313524 | A | * | 10/2002 | H01T 13/39 |
| JP | 2004235041 | A | * | 8/2004 | |
| WO | WO-2016043130 | A1 | * | 3/2016 | B23K 11/002 |
| WO | WO-2019078294 | A1 | * | 4/2019 | C22C 19/058 |

* cited by examiner

SPARK PLUG

FIELD

This disclosure generally relates to spark plugs and other ignition devices for internal combustion engines, and more particularly, to firing pads attached to spark plug electrodes.

BACKGROUND

Spark plugs can be used to initiate combustion in internal combustion engines.

Spark plugs typically ignite a gas, such as an air/fuel mixture, in an engine cylinder or combustion chamber by producing a spark across a spark gap defined between two or more electrodes. Ignition of the gas by the spark causes a combustion reaction in the engine cylinder that causes the power stroke of the engine. The high temperatures, high electrical voltages, rapid repetition of combustion reactions, and the presence of corrosive materials in the combustion gases can create a harsh environment in which the spark plug functions. This harsh environment can contribute to erosion and corrosion of the firing pads and electrodes, which can negatively affect the performance of the spark plug over time, potentially leading to a misfire or some other undesirable condition.

To reduce erosion and corrosion of the spark plug electrodes, various types of precious metals and their alloys—such as those made from platinum and iridium—have been used. These materials, however, can be costly. Thus, spark plug manufacturers sometimes attempt to minimize the amount of precious metals used with an electrode by using such materials only at a firing tip of the electrodes where a spark jumps across a spark gap. However, minimizing the amount of material can create risks of firing pad failure, as the thinner cross-section can be more susceptible to thermal cracking.

SUMMARY

According to one embodiment, there is provided a spark plug comprising a shell having an axial bore, an insulator disposed at least partially within the axial bore of the shell, a center electrode disposed at least partially within the axial bore of the insulator, a ground electrode configured to create a spark gap with the center electrode, and a firing pad attached to the center electrode or the ground electrode. The firing pad has a multilayer structure having a base layer and a firing layer. The base layer is a non-precious metal based material having silicon. The firing layer is a precious metal based material having yttrium in an amount of 0.1 to 0.5 wt %, inclusive.

In some embodiments, the silicon is present in an amount of 0.001 to 0.5 wt %, inclusive.

In some embodiments, the firing pad is a clad tape having a thickness that is less than or equal to 0.5 mm.

In some embodiments, a thickness of the firing layer is 0.1 to 0.25 mm, inclusive.

In some embodiments, after at least 190 hours of isothermal treatment of at least 1000° C., an extent of vertical cracking extending through the firing layer towards the base layer does not exceed 50% of a thickness of the firing layer.

In some embodiments, the extent of vertical cracking does not exceed 25% of a thickness of the firing layer.

In some embodiments, the precious metal based material of the firing layer has less than 1000 ppm silicon.

In some embodiments, the sparking surface has more yttrium oxides on grain boundaries than silicon oxides on grain boundaries.

In some embodiments, the firing layer has 0.01 to 1.75 at % silicon at the sparking surface.

In some embodiments, one or more vertical cracks of the vertical cracking do not extend to a voiding layer in the firing layer.

In some embodiments, the vertical cracking is sparking surface specific cracking.

In some embodiments, the sparking surface specific cracking is less than half of a grain size of the precious metal based material.

In some embodiments, the sparking surface specific cracking is less than 30 μm.

In some embodiments, the precious metal based material is platinum based.

In some embodiments, the non-precious metal based material is nickel based.

In accordance with another embodiment, there is provided a spark plug comprising a shell having an axial bore, an insulator disposed at least partially within the axial bore of the shell, a center electrode disposed at least partially within the axial bore of the insulator, a ground electrode configured to create a spark gap with the center electrode, and a firing pad attached to the center electrode or the ground electrode. The firing pad has a sparking surface. The firing pad is a precious metal based material having a rare earth element selected from the group of yttrium (Y), hafnium (Hf), scandium (Sc), lanthanum (La), cerium (Ce), and zirconium (Zr) in an amount of 0.1 to 1.0 wt %, inclusive. After at least 190 hours of isothermal treatment of at least 1000° C., an extent of vertical cracking does not exceed 50% of a thickness of the firing pad.

In some embodiments, the extent of vertical cracking does not exceed 25% of a thickness of the firing pad.

In some embodiments, the firing pad has a multilayer structure with a base layer and a firing layer.

Various aspects, embodiments, examples, features and alternatives set forth in the preceding paragraphs, in the claims, and/or in the following description and drawings may be taken independently or in any combination thereof. For example, features disclosed in connection with one embodiment are applicable to all embodiments in the absence of incompatibility of features.

DRAWINGS

Preferred example embodiments will hereinafter be described in conjunction with the appended drawings, wherein like designations denote like elements, and wherein.

DESCRIPTION

The firing pads and electrodes of the present disclosure can improve the life of the spark plug by effective minimization of thermal vertical cracking. Extensive thermal vertical cracking, particularly with respect to a thinner firing pad that minimizes the use of more expensive precious metal materials, can undesirably result in firing pad failure. It was discovered that silicon dispersion from an underlying non-precious metal based material caused the thermal vertical cracking at grain boundaries in the precious metal materials, even though silicon was not present in the precious metal material at the manufacturing stage. The present embodiments selectively control the silicon dispersion in the precious metal material of the firing pad, thereby minimizing the thermal vertical cracking to an extent that is less likely to result in firing pad failure.

The firing pads and electrodes described herein can be used in spark plugs and other ignition devices including industrial plugs, aviation igniters, or any other device that is used to ignite an air/fuel mixture in an engine. This includes spark plugs used in automotive internal combustion engines, and particularly in engines equipped to provide gasoline direct injection (GDI), engines operating under lean burning strategies, engines operating under fuel efficient strategies, engines operating under reduced emission strategies, or a combination of these. The various firing pads and electrodes may provide improved ignitability, effective pad retention, and cost-effective solutions for the use of precious metal, to cite some possible improvements.

Figure 1:
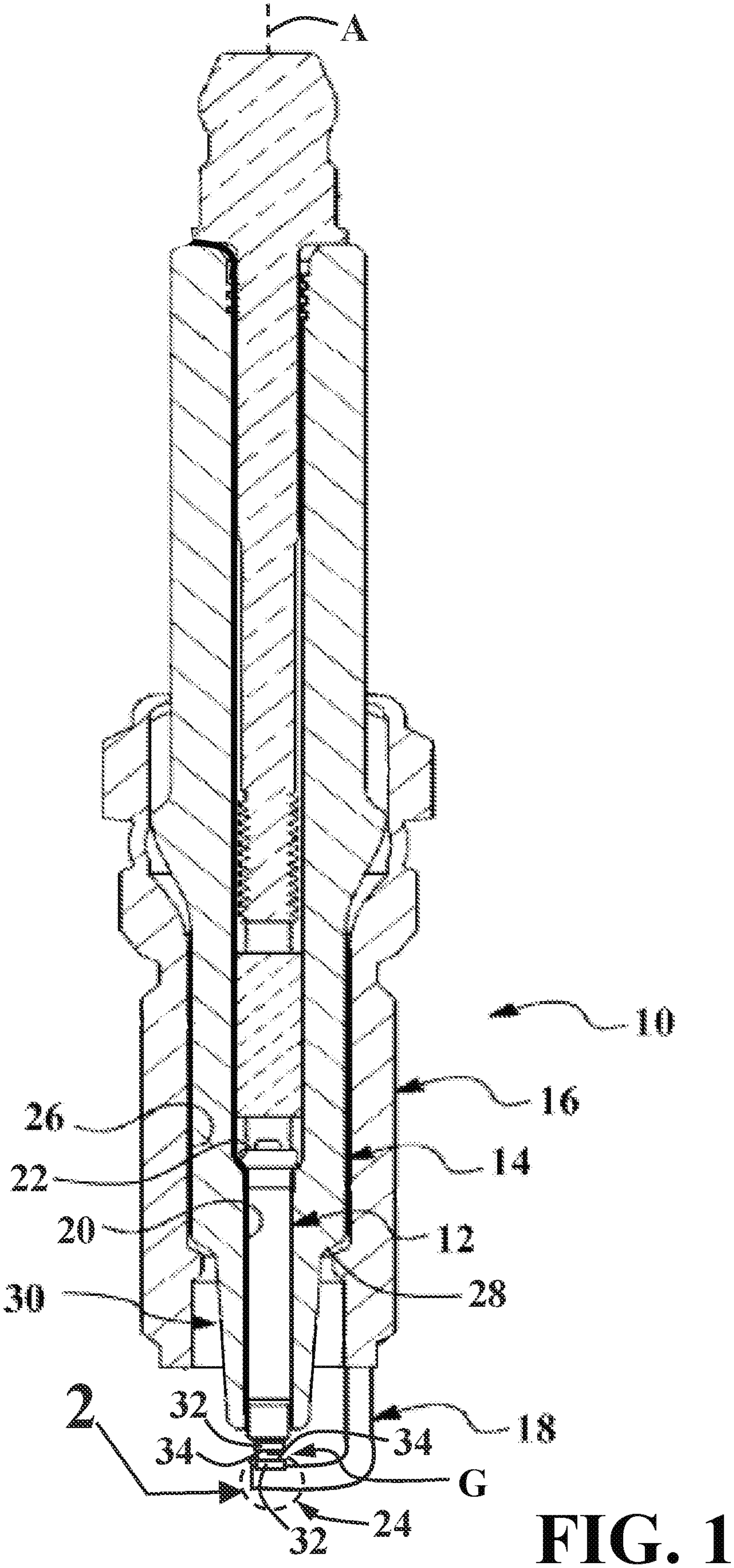
FIG. 1 is a cross-sectional view of a spark plug according to one embodiment.

Referring to FIG. 1, a spark plug 10 includes a center electrode 12, an insulator 14, a metallic shell 16, and a ground electrode 18. Other components can include a terminal stud, an internal resistor, various gaskets, and internal seals, all of which are known to those skilled in the art. The center electrode 12 is generally disposed within an axial bore 20 of the insulator 14 at an internal step 22, and may have an end portion exposed outside of the insulator at a firing end 24 of the spark plug 10. The center electrode 12 and/or the ground electrode 18 could be alternately configured than what is particularly illustrated in the figures (e.g., not a standard J-gap configuration or annular shaped firing tips on one or more of the electrodes 12, 18). The insulator 14 is generally disposed within an axial bore 26 of the metallic shell 16, resting against an internal step 28 of the shell bore 26, and has an end nose portion 30 that may be at least partially exposed outside of the shell at the firing end of the spark plug 10. The insulator 14 is made of a material, such as a ceramic material, that electrically insulates the center electrode 12 from the metallic shell 16. The metallic shell 16 provides an outer structure of the spark plug 10, and has threads for installation in an engine.

In one example, the center electrode 12 and/or ground electrode 18 is made of a non-precious metal based material, or more particularly, a nickel (Ni) alloy material containing silicon that serves as an external or cladding portion of the body, and can include a copper (Cu) or Cu alloy material that serves as an internal core of the body. As used herein, non-precious metal based refers to a material wherein 50 wt % or more is not a precious or noble metal (e.g., nickel-based). Similarly, precious metal based refers to a material wherein 50 wt % or more is a precious or noble metal (e.g., platinum-based). Some non-limiting examples of Ni alloy materials that may be used with the center electrode 12, the ground electrode 18, or both, include an alloy composed of one or more of Ni, chromium (Cr), iron (Fe), manganese (Mn), silicon (Si), or another element; and more specific examples include materials commonly known as Inconel® 600 or 601.

In an advantageous embodiment, the non-precious metal based material used for both the center electrode 12 and the ground electrode 18 is a Ni based material containing 50 wt % or more Ni and 0.001 to 0.5 wt % Si. The Si addition in this amount helps reduce residual oxygen levels, thereby improving oxidation resistance, and control carbons in the alloy. Further, this amount of Si can enhance strength and hardness while improving corrosion resistance, which is of particular benefit in the corrosive and harsh engine environment. However, as detailed further below, Si can be a very reactive element which has a stronger tendency to diffuse into precious metal based materials unless otherwise controlled.

As shown in FIG. 1, both the center electrode 12 and the ground electrode 18 include a firing pad 32. While in this embodiment, both the center electrode 12 and the ground electrode 18 have a similarly constructed firing pad 32, it is possible for one of the center electrode or the ground electrode to have an alternately constructed firing pad, or for one electrode to not have a firing pad at all, to cite a few example possibilities. Each of the firing pads 32 have a sparking surface 34 that generally defines the spark gap G.

Figure 2:
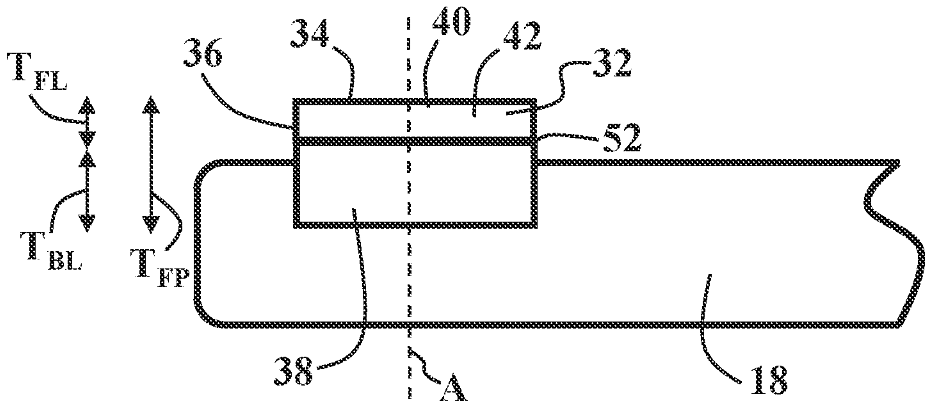
FIG. 2 is an enlarged schematic view of the sparking end of the spark plug of FIG. 1.

With particular reference to the enlarged, schematic view in FIG. 2, this particular embodiment of the firing pad 32 has a multilayer structure 36 having a base layer 38 and a firing layer 40. Whether a multilayer construction is employed in a particular embodiment may depend upon, among other factors, the exact materials selected for the firing pad 32 and the underlying electrode body and their compatibility in terms of welding and thermal transfer properties. The multilayer structure 36 is particularly advantageous because it can minimize the amount of precious metal material being used while also improving weldability; however, it should be understood that the teachings herein may also be applicable to a firing pad 32 having only a single or unitary firing layer 40 without a base layer 38. Additionally, other shapes and configurations are possible for the firing pad 32, such as a disc, rivet, annular ring, etc.

In an advantageous embodiment, the multilayer structure 36 of the firing pad 32 is a clad tape 42 having the firing layer 40 serve as the sparking surface 34 and the base layer 38 directly interface with the electrode 12, 18. A clad tape 42 is pre-formed to structurally adhere the firing layer 40 and the base layer 38, and then individual firing pads 32 are cut from the clad tape and welded to the electrode 12, 18. The clad tape 42 further helps minimize the amount of precious metal being used, which can lower costs, while providing a broader area of precious metal available at the sparking surface 34. Additionally, as detailed below, the non-precious metal base layer 38 helps improve weldability by minimizing the difference in thermal expansion coefficients between the firing pad 32 and the electrode 12, 18.

One potential challenge with the clad tape 42 structure is the limited thickness of the firing pad 32 ($T_{FP}$). While advantageous in terms of material usage, the thickness $T_{FP}$ of the multilayer structure 36 of the clad tape 42 is much smaller than the thickness of a standard prior art firing tip for a spark plug. In one embodiment, the thickness $T_{FP}$ is less than or equal to 0.5 mm, a thickness of the firing layer $T_{FL}$ is between about 0.1 to 0.25 mm, inclusive. In an advantageous embodiment, the thickness $T_{FP}$ is 0.38 mm, with a thickness of the firing layer being about 0.25 mm, and the thickness of the base layer TBL being about 0.13 mm. Given that the thickness of the firing pad $T_{FP}$ is less than 0.5 mm, and preferably, less than 0.4 mm, the firing pad 32 may be more susceptible to problems such as thermal vertical cracking.

Figure 3:
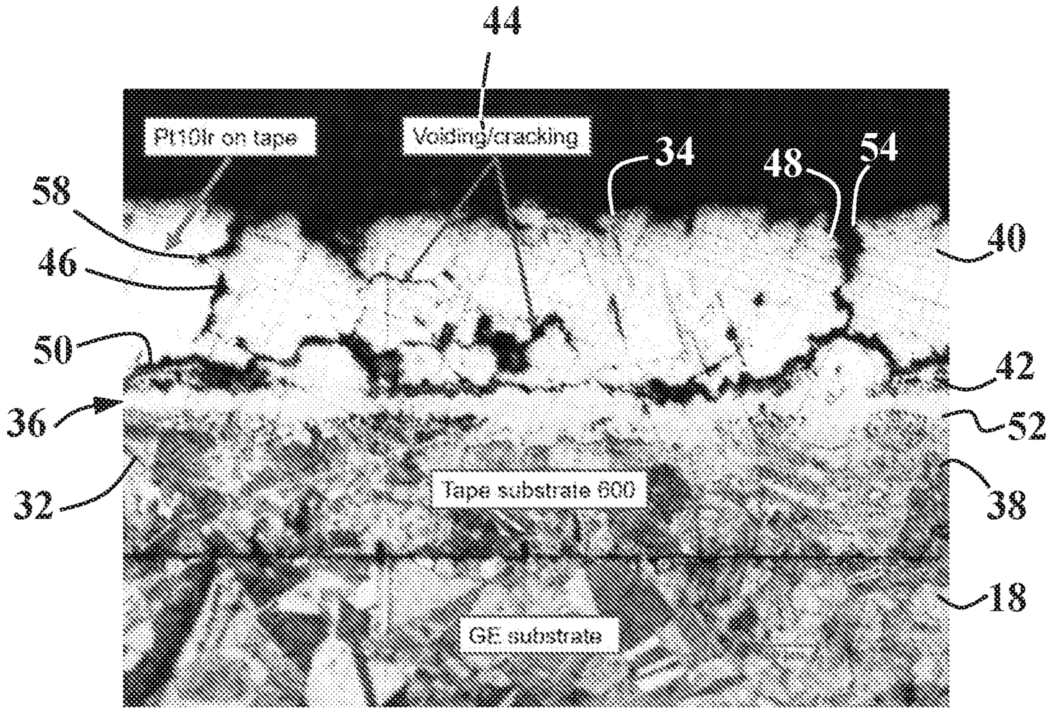
FIG. 3 (prior art)
FIG. 3 is a cross-section scanning electron microscopy (SEM) image of a prior art firing pad.

FIG. 3 shows an example of a prior art firing pad 32 in which thermal vertical cracking 44 has become so extensive that the integrity of the firing pad 32 may be wholly or partially jeopardized. "Vertical cracking" as used herein refers to cracks that extend into the thickness $T_{FL}$ of the firing layer 40 from the sparking surface 34 in a direction toward the electrode 12, 18 and away from the spark gap G. In the illustrated prior art embodiment, at least two of the cracks 46, 48 of the vertical cracking 44 reach the entire extent essentially (about 100%) through the thickness $T_{FL}$ of the firing layer 40 from the sparking surface 34 to a voiding layer 50. The voiding layer 50 is present in this embodiment with the clad tape 42, due at least in part to the Kirkendall effect and the different materials used for the firing pad 32. The voiding layer 50 extends substantially horizontally (or substantially perpendicular to the spark plug axis A), with substantially herein meaning within 25% of being exactly horizontal (or perpendicular to the spark plug axis A) or being exactly vertical (or parallel to the spark plug axis A). The voiding layer 50 is located wholly within the firing layer 40 in this embodiment, closer to the spark gap G and spaced from the interface 52 between the base layer 38 and the firing layer 40.

As can be seen in FIG. 3, at least two of the cracks 46, 48 of the vertical cracking 44 reach through greater than 25% of the thickness of the firing layer 40, and more particularly, greater than 50% of the thickness of the firing layer 40. This amount and extent of vertical cracking 44 can negatively impact performance of the plug 10. In some embodiments, vertical cracking 44 emanating more specifically from the sparking surface 34 can be especially detrimental. In such embodiments, since the average grain size of the precious metal material for the firing layer 40 is about 20-60 μm, if the cracking depth reaches about half of the grain size or more (e.g., 10-30 μm), then the risk of grain loss is high. Thus, for sparking surface specific cracking 54 where the vertical cracking 44 emanates specifically from the sparking surface 34, it may be beneficial to limit cracking depths to 10-30 μm or less. Controlling the extent of vertical cracking 44 and sparking surface specific vertical cracking 54 will help minimize grain loss of the firing layer 40 particularly at the sparking surface 34.

Figure 4:
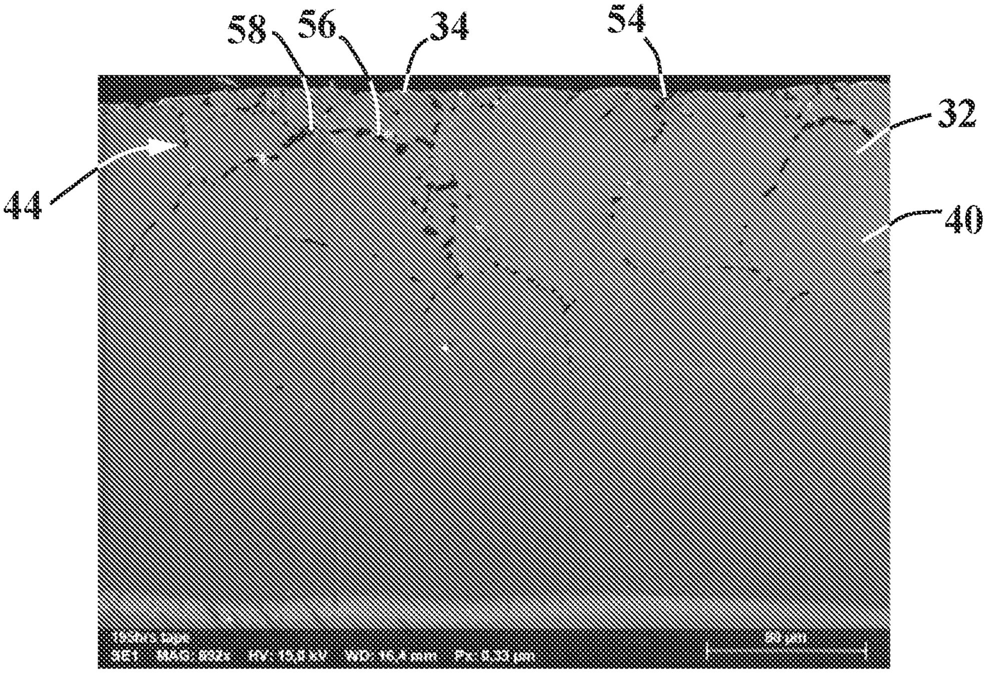
FIG. 4 (prior art)
FIG. 4 is a cross-section SEM image of another prior art firing pad.
Figure 5:
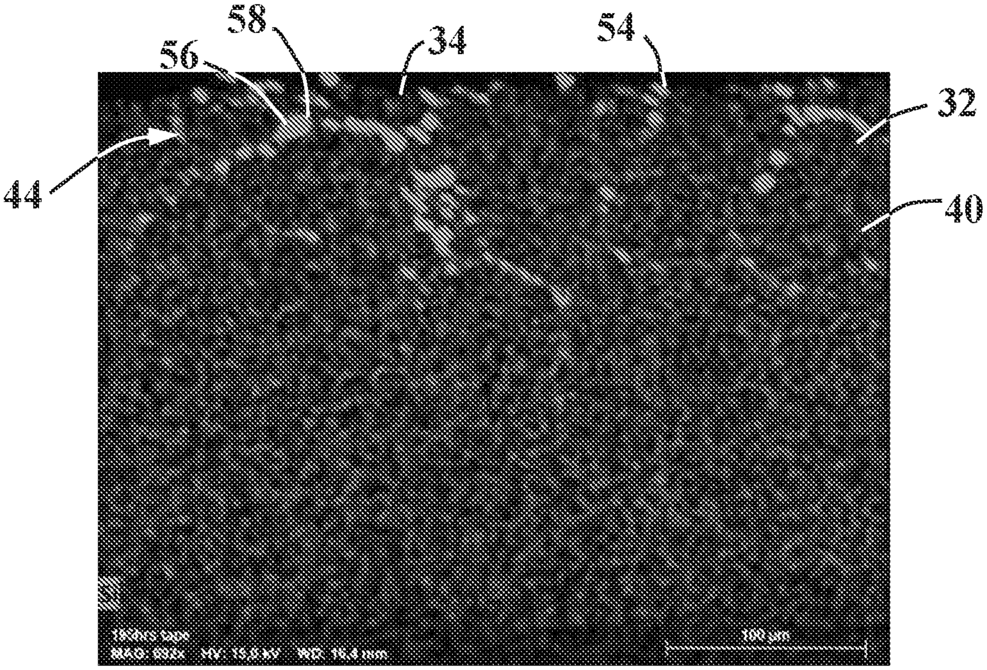
FIG. 5 (prior art)
FIG. 5 is an energy dispersive X-ray spectroscopy (EDS) image showing silicon dispersion in the firing pad of FIG. 4.
Figure 6:
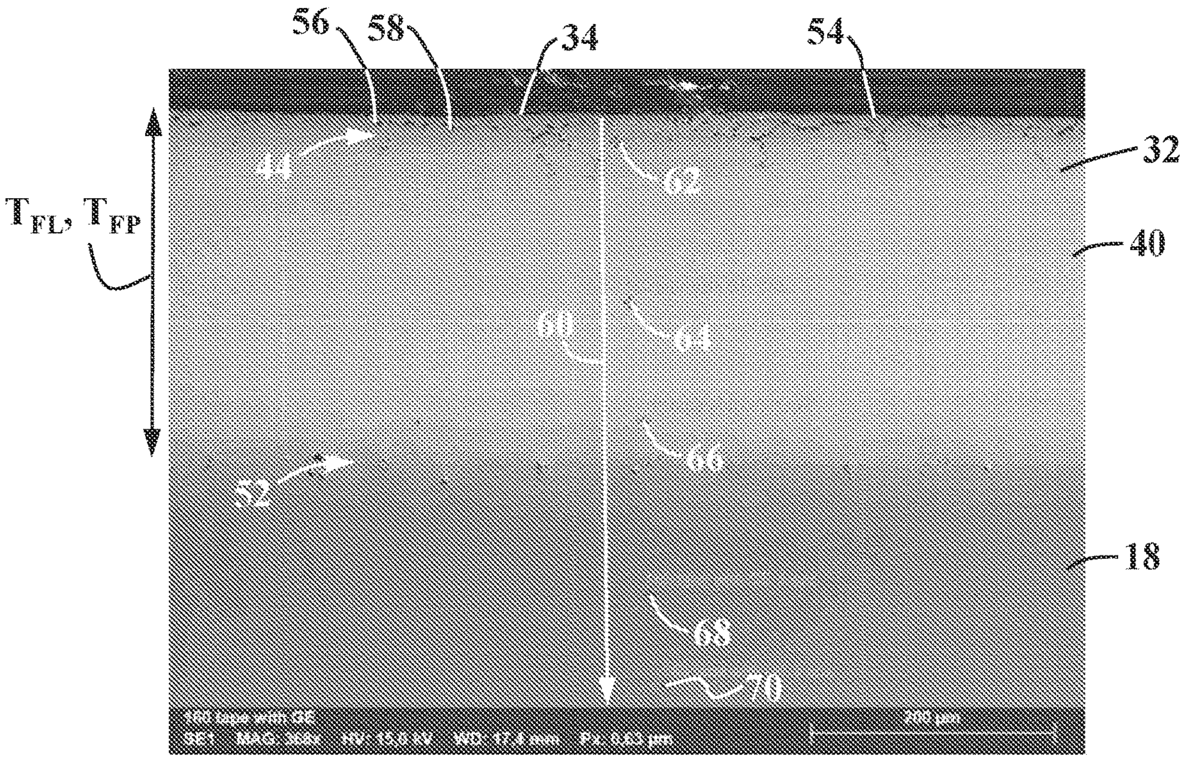
FIG. 6 (prior art)
FIG. 6 is a cross-section SEM image of a prior art firing pad, showing sampled points and an analysis line for measuring the silicon dispersion.
Figure 7:
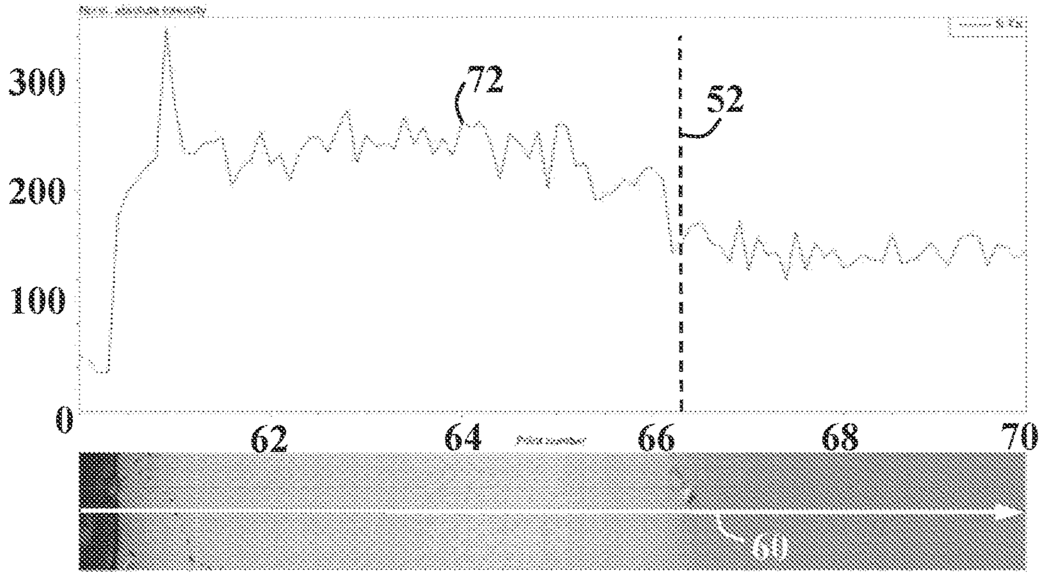
FIG. 7 (prior art)
FIG. 7 is a graph illustrating the silicon dispersion along the analysis line of FIG. 6.

The vertical cracking 44 is shown and described with respect to the prior art representations of the firing pad 32, as shown in FIGS. 4-7. FIG. 4 is a cross-section SEM image of another prior art firing pad 32, and FIG. 5 is an energy dispersive X-ray spectroscopy (EDS) image showing silicon dispersion along the vertical cracking 44 in the firing pad 32. FIG. 6 is another cross-section SEM image of the firing pad 32, showing sampled points and an analysis line for measuring the silicon dispersion, and FIG. 7 is a graph illustrating the silicon dispersion 72 along the analysis line of FIG. 6. The imaging in FIGS. 4 and 5 took place after isothermal treatment of 1100° C. for 195 hours, and the imaging and analysis of FIG. 6 and took place after isothermal treatment of 1000° C. for 160 hours. In an advantageous embodiment, SEM, EDS, and/or Electron Probe Micro Analysis (EPMA with, e.g., 10-100 ppm sensitivity) is used to analyze the metallurgical structure and vertical cracking 44, 54 after at least 190 hours of isothermal treatment of at least 1000° C., as this amount of isothermal treatment can better mimic internal combustion engine conditions.

In the embodiment of FIGS. 4-7, the precious metal based material for the firing layer 40 is platinum (Pt) based, and more particularly, Pt10Ir. Notably, after isothermal testing it was discovered that the vertical cracking 44, 54 was the result of silicon (Si) 56 as shown in the EDS image of FIG. 5. However, the silicon 56 was not present in appreciable measure in the firing layer 40 at the time of manufacture. Over time and with exposure to the heat of combustion, the silicon 56 diffused through the ground electrode 18 and/or base layer 38 and formed silicon oxides at the grain boundaries 58. Silicon atoms were shown in these implementations to diffuse to and aggregate on grain boundaries 58 during isothermal oxidation tests, forming silicon oxides on the grain boundaries. These silicon oxides can be proportionally large and brittle the grain boundaries 58. Thus, while silicon in the non-precious metal based material of the base layer 38, center electrode 12, and/or ground electrode 18 can be beneficial as it can reduce residual oxygen levels and control carbons, its propensity to diffuse through the precious metal based material of the firing layer 40 can be selectively controlled to minimize the vertical cracking 44 to a more acceptable level that is less likely to undermine spark plug 10 performance.

Extensive analysis and testing was used to show that the Si-rich grain boundaries 58 were not the result of sample preparation, and instead occurs operationally to eventually cause pad failure. With particular reference to FIGS. 6 and 7, the amount of silicon 56 was measured at a number of points along the analysis line 60, with points 62, 64, 66, 68, 70 extending from the sparking surface 34 through the firing layer 40, interface 52, and base layer 38, which in this embodiment, is the ground electrode 18 made of Inconel® 600. The table below shows the Si-distribution along each of the points 62, 64, 66, 68, 70, with cps/eV representing counts per second per electron-volt and the amount of each element being listed in atomic percent:

TABLE 1

| Ref. Point | cps/eV | Si at % | Cr at % | Fe at % | Ni at % | Ir at % | Pt at % |
|---|---|---|---|---|---|---|---|
| 62 | 1.60 | 2.18 | 0.05 | 0.01 | — | 4.79 | 92.97 |
| 64 | 1.40 | 1.63 | — | — | — | 4.79 | 93.58 |
| 66 | 3.35 | 0.81 | 14.02 | 5.49 | 35.69 | 1.57 | 42.43 |
| 68 | 8.97 | 0.95 | 16.26 | 7.72 | 71.77 | — | 3.30 |
| 70 | 8.64 | 0.87 | 16.26 | 7.82 | 71.97 | — | 3.08 |

As shown, the amount of silicon 56 near the sparking surface 34 was 2.18 at %, whereas it is desirable to maintain the amount of silicon at the sparking surface to 0.01 to 1.75 at %, as this amount of silicon is less likely to create undesirable forms of thermal vertical cracking 44, including the sparking surface specific cracking 54. Moreover, looking at the firing layer 40 as a whole, it is advantageous to maintain the amount of diffused silicon 56 to less than 1000 ppm for each portion through the thickness $T_{FL}$ of the firing layer. Again, controlling the silicon diffusion to 1000 ppm or less through the thickness $T_{FL}$ of the firing layer 40 can help improve the structure of the firing pad 32 over time and minimize the thermal cracking 44 and the sparking surface specific cracking 54.

Figure 8:
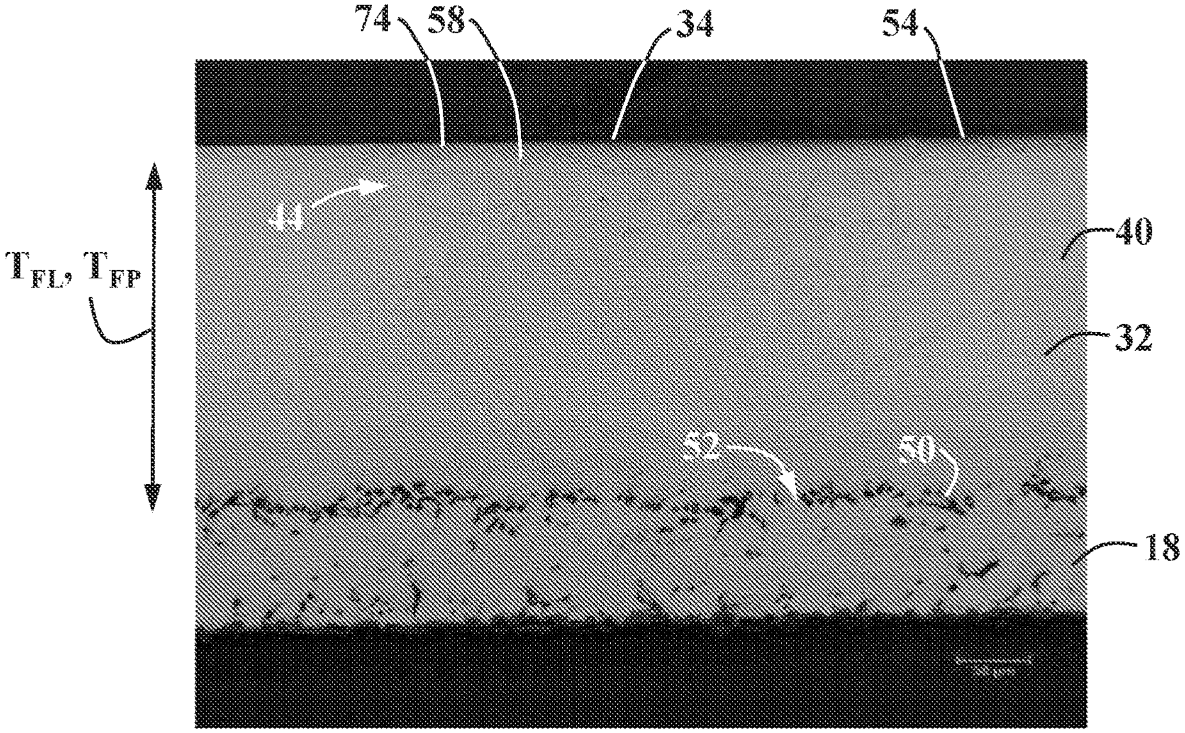
FIG. 8 is a cross-section SEM image of a firing pad in accordance with the embodiment of FIGS. 1 and 2.

In one embodiment, to arrive at a structurally sound amount of vertical cracking 44 while minimizing the amount of silicon 56 oxidized near the sparking surface 34, 0.1-0.5 wt % inclusive yttrium (Y) is added to the precious metal based material of the firing layer 40. FIG. 8 is an SEM image showing a more appropriate level of vertical cracking 44 and sparking surface specific cracking 54 that is less likely to result in failure of the pad 32. Minimizing the vertical cracking 44 after isothermal treatment (e.g., at least 1000° C. for at least 190 hours) can be advantageously accomplished by adding 0.1-0.5 wt % inclusive Y, preferably to a Pt10Ir precious metal based material. Adding this amount can prevent the formation of coarse and brittle silicon oxide particles on the grain boundaries 58 near the sparking surface 34. While yttrium oxide is sometimes added to improve strength of the precious metal based materials, instead, adding more active yttrium to the alloy can enhance the oxidation performance and form finely dispersed particles within grains and also on grain boundaries 58 as opposed to the more brittle and larger silicon oxides on grain boundaries. The yttrium can also react quickly with oxygen to form a protective layer 74 on the sparking surface 34, while also forming dispersed yttrium oxide in the grain boundaries 58 and within the grains. Thus, the grain boundaries 58 end up having more yttrium oxides than silicon oxides to help minimize the large vertical cracking 44.

Accordingly, the center electrode 12, the ground electrode 18, and/or the base metal layer 38 is a non-precious metal based material containing silicon to help reduce residual oxygen levels and control carbons, and the firing layer 40 of the firing pad 32 includes yttrium. With a multilayer structure 36 for the firing pad 32, the base layer 38 acts as a backing to provide strength and rigidity to a thinner precious metal firing layer 40, and is preferably made of a material that enhances initial weldability and subsequent retention to the center electrode 12/ground electrode 18. In other words, in some cases the precious metal material may be more easily attached and retained to the material of the base layer 38 than directly to the electrode body (such as in the case when manufacturing thin, multi-layered clad tapes 42). Examples of materials for the non-precious metal based material include Ni-alloys that can contain chromium (Cr), iron (Fe), aluminum (Al), manganese (Mn), Si (0.001 to 0.5 wt %, inclusive), and/or another element; and more specific examples include Inconel® 600 or 601. In a particular embodiment, the non-precious metal based material is Ni-based with Cr added in an amount from 0.01 to 25 wt % inclusive, Fe from 0.01-20 wt % inclusive, Al from 0.01-2 wt % inclusive, niobium (Nb) from 0.01-5 wt %, molybdenum (Mo) from 0.01-5 wt %, with Si up to 0.5 wt %.

For the firing layer 40, an advantageous embodiment for the precious metal based material is Pt-10Ir-(0.1-0.5)Y (in wt %). Several other precious metal based materials with a rare earth element addition could also be used, particularly with the multilayer 36 clad tape 42 implementation, where the thickness $T_{FL}$ of the firing layer 40 is substantially smaller than other firing pads 32. The minor addition of a rare earth element may include Y, hafnium (hf), scandium (Sc), lanthanum (La), cerium (Ce) and/or zirconium (Zr). The amount of the minor rare earth element can be added in an amount of 0.01-1 wt % inclusive. In some embodiments, one or more of these minor rare earth element additions can be added to the following precious metal materials to create the precious metal based material for the firing layer 40: (1) Pt—Ir alloy, with the Ir content being 0-49 wt %; (2) Pt-rhodium (Rh) alloy, the Rh content being 0-49 wt %; (3) Pt—Ni alloy, the Ni content being 0-49 wt %; (4) Pt-palladium (Pd) alloy, the Pd content being 0-49 wt %; (5) Pt-ruthenium (Ru) alloy, the Ru content being 0-49 wt %; (6) Ir—Rh alloy, the Rh content being 0-49 wt %; (7) Ir—Ru alloy, the Ru content being 0-49 wt %; (8) Ir—Pt alloy, the Pt content being 0-49 wt %; (9) Ir—Rh alloy, the Rh content being 0-49 wt %; or (10) Ir—Pd alloy, the Pd content being 0-49 wt %. In other embodiments, the precious metal system includes ternary alloys with the addition of the rare earth element, the ternary alloys including three major elements selected from Pt, Ir, Rh, Pd, Ru, and gold (Au).

It is to be understood that the foregoing is a description of one or more preferred example embodiments. The invention is not limited to the particular embodiment(s) disclosed herein, but rather is defined solely by the claims below. Furthermore, the statements contained in the foregoing description relate to particular embodiments and are not to be construed as limitations on the scope of the invention or on the definition of terms used in the claims, except where a term or phrase is expressly defined above. Various other embodiments and various changes and modifications to the disclosed embodiment(s) will become apparent to those skilled in the art. All such other embodiments, changes, and modifications are intended to come within the scope of the appended claims.

As used in this specification and claims, the terms "for example," "e.g.," "for instance," "such as," and "like," and the verbs "comprising," "having," "including," and their other verb forms, when used in conjunction with a listing of one or more components or other items, are each to be construed as open-ended, meaning that the listing is not to be considered as excluding other, additional components or items. Other terms are to be construed using their broadest reasonable meaning unless they are used in a context that requires a different interpretation. In addition, the term "and/or" is to be construed as an inclusive OR. Therefore, for example, the phrase "A, B, and/or C" is to be interpreted as covering all the following: "A"; "B"; "C"; "A and B"; "A and C"; "B and C"; and "A, B, and C."

The invention claimed is:

1. A spark plug, comprising:

a shell having an axial bore;

an insulator disposed at least partially within the axial bore of the shell;

a center electrode disposed at least partially within the axial bore of the insulator;

a ground electrode configured to create a spark gap with the center electrode; and a firing pad attached to the center electrode or the ground electrode, wherein the firing pad has a multilayer structure having a base layer and a firing layer, wherein the base layer is a non-precious metal based material having silicon, and wherein the firing layer is a precious metal based material having yttrium in an amount of 0.1 to 0.5 wt %, inclusive, and wherein the non-precious metal based material of the base layer has 50 wt % or more of non-precious metal, wherein the base layer is a backing for the firing layer to create a weldment that is at least partially separate from the non-precious metal material of the base layer.

2. The spark plug of claim 1, wherein the silicon is present in an amount of 0.001 to 0.5 wt %, inclusive.

3. The spark plug of claim 1, wherein the firing pad is a clad tape having a thickness that is less than or equal to 0.5 mm.

4. The spark plug of claim 3, wherein a thickness of the firing layer is 0.1 to 0.25 mm, inclusive.

5. The spark plug of claim 1, wherein the firing layer has a sparking surface, and wherein after at least 190 hours of isothermal treatment of at least 1000° ° C., an extent of vertical cracking extending through the firing layer towards the base layer does not exceed 50% of a thickness of the firing layer.

6. The spark plug of claim 5, wherein the extent of vertical cracking does not exceed 25% of a thickness of the firing layer.

7. The spark plug of claim 5, wherein the precious metal based material of the firing layer has less than 1000 ppm silicon.

8. The spark plug of claim 5, wherein the sparking surface has more yttrium oxides on grain boundaries than silicon oxides on grain boundaries.

9. The spark plug of claim 5, wherein the firing layer has 0.01 to 1.75 at % silicon at the sparking surface.

10. The spark plug of claim 5, wherein one or more vertical cracks of the vertical cracking do not extend to a voiding layer in the firing layer.

11. The spark plug of claim 5, wherein the vertical cracking is sparking surface specific cracking.

12. The spark plug of claim 11, wherein the sparking surface specific cracking is less than half of a grain size of the precious metal based material.

13. The spark plug of claim 12, wherein the sparking surface specific cracking is less than 30 μm.

14. The spark plug of claim 1, wherein the precious metal based material is platinum based.

15. The spark plug of claim 1, wherein the non-precious metal based material is nickel based.

16. A spark plug, comprising:

a shell having an axial bore;

an insulator disposed at least partially within the axial bore of the shell;

a center electrode disposed at least partially within the axial bore of the insulator;

a ground electrode configured to create a spark gap with the center electrode; and a firing pad attached to the center electrode or the ground electrode, wherein the firing pad has a sparking surface, wherein the firing pad is a precious metal based material, the precious metal based material having 50 wt % or more of platinum (Pt) and/or iridium (Ir), the precious metal based material having a rare earth element selected from the group of yttrium (Y), hafnium (Hf), scandium (Sc), lanthanum (La), cerium (Ce), and zirconium (Zr) in an amount of 0.1 to 1.0 wt %, inclusive, and wherein after at least 190 hours of isothermal treatment of at least 1000° ° C., an extent of vertical cracking does not exceed 50% of a thickness of the firing pad.

17. The spark plug of claim 16, wherein the extent of vertical cracking does not exceed 25% of a thickness of the firing pad.

18. The spark plug of claim 16, wherein the firing pad has a multilayer structure with a base layer and a firing layer.

19. A spark plug, comprising:

a shell having an axial bore;

an insulator disposed at least partially within the axial bore of the shell;

a center electrode disposed at least partially within the axial bore of the insulator;

a ground electrode configured to create a spark gap with the center electrode; and a firing pad attached to the center electrode or the ground electrode, wherein the firing pad has a sparking surface and a multilayer structure having a base layer and a firing layer, wherein the base layer is a non-precious metal based material having silicon, and wherein the firing layer is a precious metal based material having yttrium in an amount of 0.1 to 0.5 wt %, inclusive, wherein the non-precious metal based material of the base layer has 50 wt % or more of non-precious metal, and wherein the firing pad has a voiding layer extending substantially horizontal at least partially between the base layer and the sparking surface.

20. The spark plug of claim 19, wherein the voiding layer is located within the firing layer such that the voiding layer is spaced from an interface between the base layer and the firing layer.

* * * * *